(12) United States Patent
Hayashi et al.

(10) Patent No.: US 7,461,716 B2
(45) Date of Patent: Dec. 9, 2008

(54) POWER UNIT SUPPORTING STRUCTURE OF SCOOTER TYPE VEHICLE

(75) Inventors: Hideki Hayashi, Saitama (JP); Elji Kinbara, Saitama (JP); Jun Fujii, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 259 days.

(21) Appl. No.: 11/527,598

(22) Filed: Sep. 27, 2006

(65) Prior Publication Data

US 2007/0074920 A1  Apr. 5, 2007

(30) Foreign Application Priority Data

Sep. 30, 2005 (JP) ............... 2005-286302

(51) Int. Cl.
*B62K 11/00* (2006.01)
(52) U.S. Cl. ............... 180/228; 180/295; 180/299; 180/219; 180/227
(58) Field of Classification Search ............... 180/228, 180/295, 299, 219; 280/284
See application file for complete search history.

(56) References Cited

U.S. PATENT DOCUMENTS

| | | | |
|---|---|---|---|
| 4,324,306 A * | 4/1982 | Ishihara et al. ............... | 180/228 |
| 6,595,310 B2 * | 7/2003 | Gogo ............... | 180/219 |
| 6,722,461 B2 * | 4/2004 | Gogo ............... | 180/227 |
| 7,178,620 B2 * | 2/2007 | Toyoda ............... | 180/227 |
| 2007/0102218 A1 * | 5/2007 | Ishii ............... | 180/227 |

FOREIGN PATENT DOCUMENTS

JP  2003-237674 A  8/2003

* cited by examiner

*Primary Examiner*—Joanne Silbermann
*Assistant Examiner*—Tashiana Adams
(74) *Attorney, Agent, or Firm*—Birch, Stewart, Kolasch & Birch, LLP

(57) ABSTRACT

A power unit supporting structure for minimizing rotational vibration about the center of gravity of a power unit, and secondary vibration in the direction of a cylinder axis line of the power unit. The structure includes a link mechanism having a first frame side link swingably connected to a first pivot on the side of a rear frame, and first power unit side links swingably connected to a third pivot on a side of the power unit. The first frame side link and the first power unit side links are swingably connected by a second pivot. A first line segment connecting the first pivot and the second pivot is disposed approximately perpendicular to a cylinder axis line. A second line segment connecting the second pivot and the third pivot is approximately parallel to a third line segment connecting the third pivot and the center of gravity of the power unit.

20 Claims, 10 Drawing Sheets

POWER UNIT SUPPORTING STRUCTURE OF SCOOTER TYPE VEHICLE

CROSS-REFERENCE TO RELATED APPLICATION

The present application claims priority under 35 U.S.C. §119 to Japanese Patent Application No. 2005-286302, filed Sep. 30, 2005, the entire contents of which are hereby incorporated by reference.

BACKGROUND OF THE INVENTION

1. Field of the Invention

The present invention relates to an improvement of a power unit supporting structure of a scooter type vehicle.

2. Description of Background Art

Heretofore, on the power unit supporting structure of a scooter type vehicle, one in which a power unit provided with a balancer shaft is swingably attached to the vehicle frame through a link is known (for example, refer to Japanese Patent Application Laid-open No. 2003-237674.

As shown in FIGS. 14 and 15 of Japanese Patent Application Laid-open No. 2003-237674, a power unit 3, which drives a rear wheel 2, is swingably attached to a vehicle frame 4 through a link 5.

One end of the link 5 is connected to damper rubber assemblies 64 and 65 with supporting shafts 61 and 62, the damper rubber assemblies 64 and 65 being attached to two cylindrical bosses 51 and 52 on the side of the vehicle frame 4; and the other end of the link 5 is connected to an upper portion of the power unit 3 with a supporting shaft 63.

The link 5 extends roughly along an imaginary line L extending from a contacting point P of the rear wheel 2 through the center of gravity G of a power unit 3. In addition, the direction of a vibration of the power unit 3 is perpendicular to the link 5, the vibration thereof being caused by a coupling force which occurs due to the distance between a crankshaft 16 and a balancer 17 when the engine is in operation. For these reasons, the above vibration of the power unit 3 can be effectively damped by the swinging of the link 5. However, when a secondary vibration in the direction of the cylinder axis of an engine 11 is occurs on the power unit 3, it is difficult to effectively reduce the above-mentioned secondary vibration, since the link 5 tilts to the direction of the cylinder axis.

SUMMARY AND OBJECTS OF THE INVENTION

An object of the present invention is to check a rotational vibration about the center of gravity of a power unit, the rotational vibration being caused by a coupling force which occurs due to the distance between a crankshaft and a balancer, and also to effectively check a secondary vibration of the power unit in the direction of the cylinder axis.

According to a first aspect of the present invention, a power unit supporting structure of a scooter type vehicle, in which a power unit having a cylinder axis line being tilted forward and provided with a balancer shaft for reducing a vibration, is swingably connected to a vehicle frame through a link mechanism. The power unit supporting structure includes the following features. A link mechanism includes a frame side link being swingably connected to a frame side pivot provided to the vehicle frame, and a power unit side link being swingably connected to a power unit side pivot provided to the power unit side. A frame side link and the power unit side link are swingably connected to each other with a link pivot. A first line segment connecting the frame side pivot and the link pivot is disposed such that the first line segment is approximately perpendicular to the cylinder axis line. A second line segment connecting the power unit side pivot and the link pivot is approximately parallel to a third line segment connecting power unit side pivot and the center of gravity of the power unit.

With the first line segment being disposed approximately perpendicular to the cylinder axis line it is possible to effectively absorb the secondary vibration of the power unit in the direction of the cylinder axis line by the swinging of the frame side link in the direction of the cylinder axis line. Further, since the second line segment and the third line segment are arranged approximately parallel to each other, the rotational vibration about the center of gravity of the power unit is absorbed by the swinging of the power unit side link in a direction approximately perpendicular to the third line segment.

According to a second aspect of the present invention, a second link mechanism swingably connects the power unit to the vehicle frame. The second link mechanism includes a second frame side link being swingably connected to a second frame side pivot provided to the vehicle frame, and a second power unit side link being connected to a second power unit side pivot provided to the power unit side. The second frame side link and the second power unit side link are swingably connected to each other with a second link pivot. The first line segment of the link mechanism is formed such that the length of the first line segment is greater than that of a fourth line segment connecting the second frame side pivot and the second link pivot. In addition, the second line segment of the link mechanism is formed such that the length of the second line segment is smaller than that of a fifth line segment of the second link mechanism, connecting the second power unit-side pivot and the second link pivot.

The first line segment of the link mechanism is formed such that the length of the first line segment of the link mechanism is greater than that of the fourth line segment of the second link mechanism. As a result, the secondary vibration of the power unit in the direction of the cylinder axis can be easily absorbed with the link mechanism. In addition, the second line segment of the link mechanism is formed such that the length of the second line segment of the link mechanism is smaller than the length of the fifth line segment of the second link mechanism. As a result, the rotational vibration about the center of gravity of the power unit can be easily absorbed with the second link mechanism.

According to a third aspect of the present invention, the fourth line segment is disposed in a tilted position in advance, such that the fourth line segment becomes perpendicular to the cylinder axis line when the power unit swings.

With this arrangement, when the power unit swings as a result of being exposed to a coupling force and to an external force from a rear wheel, and the first line segment connecting the frame side pivot and the link pivot becomes not perpendicular to the cylinder axis line any longer, the fourth line segment of the second link mechanism, connecting the second frame side pivot and the second link pivot, becomes perpendicular to the cylinder axis line.

According to a fourth aspect of the present invention, the vehicle frame includes a down frame extending obliquely backward and downward from a head pipe, a bottom frame extending backward from the down frame, and a rear frame extending obliquely backward and upward from a rear end of the bottom frame; and the rear frame is provided with both of the link mechanism and the second link mechanism.

With this arrangement, the provision of the link mechanism and the second link mechanism to different frame members of the vehicle frame, for example, makes it difficult to maintain a positional relationship between the two link mechanisms constant due to deformations of the respective frames. However, the provision of the two link mechanisms to the same rear frame allows inputs to the vehicle frame from the link mechanism and the second link mechanism to be concentrated onto the rear frame and the positional relationship between the link mechanism and the second link mechanism to be maintained almost constant.

According to a fifth aspect of the present invention, the link mechanism is disposed on a side of the power unit.

With this arrangement, disposing the link mechanism on a side of the power unit enables a space on a side of the power unit to be put to good use.

EFFECTS OF THE INVENTION

According to the first aspect of the present invention, the first line segment connecting the frame side pivot and the link pivot is disposed such that the first line segment is approximately perpendicular to the cylinder axis line, and the second line segment connecting the power unit side pivot and the link pivot is approximately parallel to the third line segment connecting power unit side pivot and the center of gravity of the power unit. This results in the rotational vibration about the center of gravity of the power unit, caused by a coupling force which occurs due to the distance between the crankshaft and the balancer shaft, to be effectively checked with the first frame side link. At the same time, the secondary vibration of the power unit in the direction of the cylinder axis line can also be effectively checked with the power unit side link.

According to the second aspect of the present invention, the first line segment of the link mechanism is formed such that the length of the first line segment is greater than the length of the fourth line segment connecting the second frame side pivot and the second link pivot, and the second line segment of the link mechanism is formed such that the length of the second line segment is smaller than the length of the fifth line segment of the second link mechanism, connecting the second power unit side pivot and the second link pivot. As a result, the secondary vibration of the power unit in the direction of the cylinder axis line can be effectively absorbed mainly by the link mechanism. In addition, the rotational vibration about the center of gravity, caused by a coupling force which occurs due to the distance between the crankshaft and the balancer shaft, can be effectively absorbed mainly by the second link mechanism. Thus, the absorbing of vibrations in various directions can be shared by the respective link mechanisms, and a link mechanism, which is suited to each vibration mode, can be set.

According to the third aspect of the present invention, the fourth line segment is disposed in a tilted position in advance, such that the fourth line segment becomes perpendicular to the cylinder axis line when the power unit swings. Accordingly, when the power unit swings being exposed to a coupling force from the engine and to an external force from the rear wheel, and the first line segment connecting the frame side pivot and the link pivot becomes not perpendicular to the cylinder axis line any more, the fourth line segment of the second link mechanism, connecting the second frame side pivot and the second link pivot, becomes perpendicular to the cylinder axis line. Thus, the secondary vibration can be effectively checked by the second link mechanism.

According to the fourth aspect of the present invention, the vehicle frame includes the down frame extending obliquely backward and downward from the head pipe, the bottom frame extending backward from the down frame, and the rear frame extending obliquely backward and upward from a rear end of the bottom frame; and the rear frame is provided with both of the link mechanism and the second link mechanism. Accordingly, inputs to the vehicle frame from the link mechanism and the second link mechanism can be concentrated onto the rear frame; even when the vehicle frame is deformed, the positional relationship between the link mechanism and the second link mechanism can be maintained approximately constant. Thus, high effectiveness of vibration insulation can be constantly brought about.

According to the fifth aspect of the present invention, since the link mechanism is disposed on a side of the power unit, a dead space on a side of the power unit can be put to good use, and a scooter type vehicle can be downsized.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
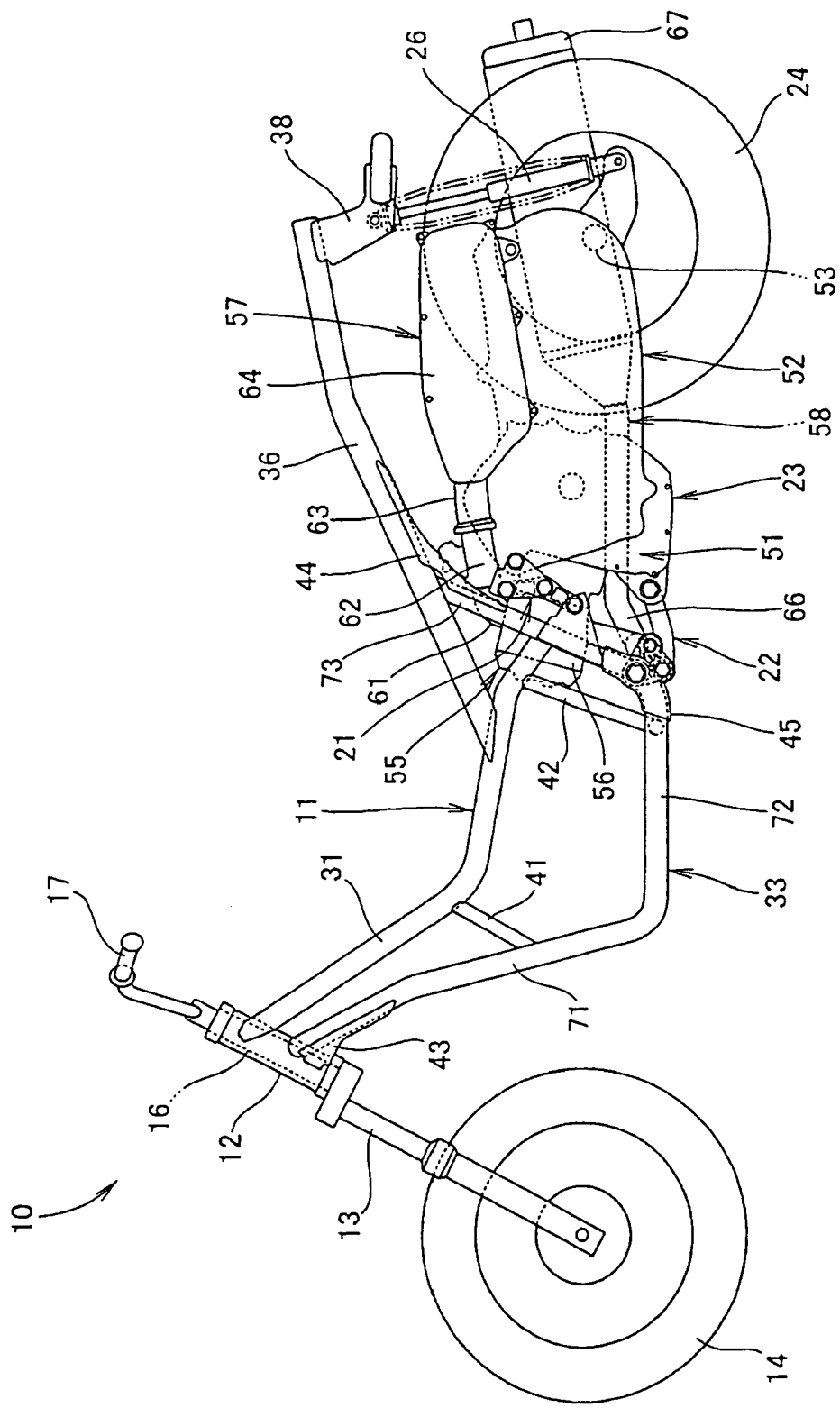
FIG. 1 is a side elevational view showing a main part of a scooter type vehicle provided with a power unit supporting structure in the present invention.

An embodiment of the present invention is described hereinafter with reference to the accompanying drawings. The drawings are such that they are viewed based on the orientations of reference numerals.

FIG. 1 is a side elevational view showing a main part of a scooter type vehicle provided with a power unit supporting structure in the present invention. A scooter type vehicle 10 includes a vehicle frame 11 forming a skeleton; and a front fork 13 which is attached to a head pipe 12 constituting a front end portion of the vehicle frame 11 such that the front fork 13 can be freely steered. A front wheel 14 is attached to a lower end of the front fork 13; a bar handle 17 attached to an upper portion of a steering stem 16 constituting the front fork 13. A power unit 23 is swingably attached to the vehicle frame 11 in the middle thereof through an upper link mechanism 21 and a lower link mechanism 22. A rear wheel 24 is attached to a rear portion of the power unit 23; and a rear cushion unit 26 attached to and bridged between a rear end portion of the power unit 23 and a rear end of the vehicle frame 11.

The vehicle frame 11 includes a pair of left and right main frames 31, 32 (showing only reference numeral 31 on the near side) extending obliquely downward and backward from the head pipe 12; and a pair of left and right lower frames 33, 34 (showing only reference numeral 33 on the near side) placed under the main frames 31, 32, and extending backward from the head pipe 12. A pair of left and right seat rails 36, 37 (showing only reference numeral 36 on the near side) extend obliquely upward and backward from the rear portions of the main frames 31, 32, and are connected at the middle portions thereof to the rear ends of the lower frames 33, 34. A cross member 38 connects the ends respectively of the left and the right seat rails 36, 37 with each other. Also included are reinforcing pipes 41, 42, and reinforcing members 43-45.

The power unit 23 includes an engine 51 constituting the front portion, and a continuously variable transmission 52 extending backward from a side of the engine 51; and the rear wheel 24 is attached to an output axel 53 provided to the rear end of the continuously variable transmission 52.

The engine 51 is a power source which is provided with a cylinder portion 55 having a roughly horizontal cylinder axis line, in which an intake system 57 is connected to the cylinder portion 55, specifically to an upper portion of a cylinder head 56 constituting the cylinder portion 55, and in which an exhaust system 58 is connected to a lower portion of the cylinder head 56

The intake system 57 includes a throttle body 62 which is connected to the cylinder head 56 through an intake tube 61, and an air cleaner which is connected to the throttle body 62 through a connecting tube 63.

The exhaust system 58 includes an exhaust tube 66 one end of which is connected to the cylinder head 56, and a muffler 67 which is connected to the other end of the exhaust tube 66.

The lower frame 33 constituting the vehicle frame 11 is a member in which a down frame 71 extending backward and downward, a bottom frame 72 being roughly horizontal, and a rear frame 73 extending backward and upward are integrally provided; and in which the upper link mechanism 21 and the lower link mechanism 22 are attached to the rear frame 73. The lower frame 34 is also configured of a down frame 71, a bottom frame 72, and a rear frame 73 as in the case of the lower frame 33, but only the lower link mechanism 22 is attached to the rear frame 73.

Figure 2:
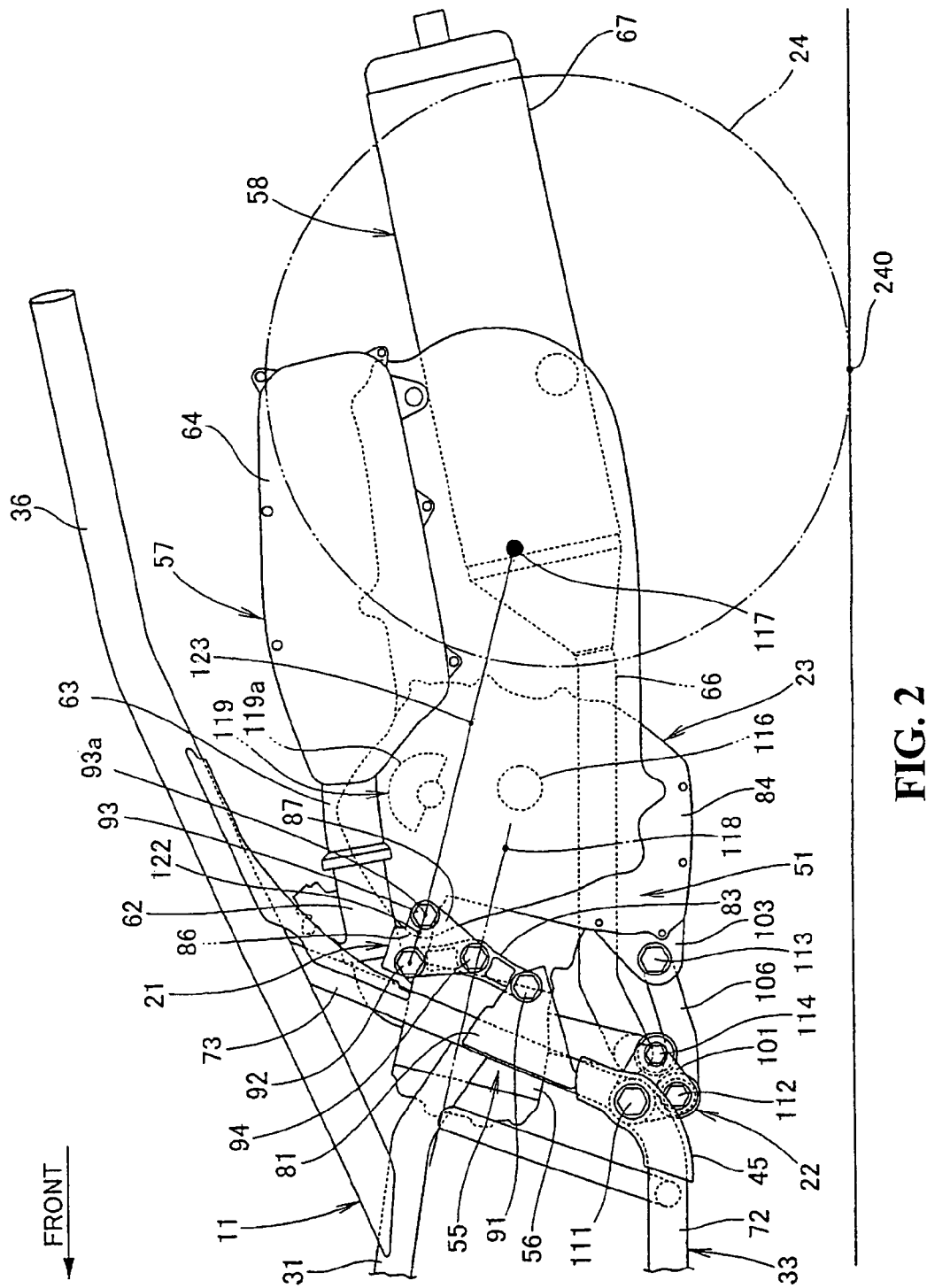
FIG. 2 is a side elevational view showing a rear portion of a vehicle in the present invention.

FIG. 2 is a side elevational view (in the drawing, an arrow (FRONT) indicates the forward direction of a vehicle; and the arrow indicates the same in the following drawings.) showing a rear portion of a vehicle in the present invention. The upper link mechanism 21 includes a doglegged first frame side link 83, one end of which is swingably attached to two pieces of upper brackets 81, 82 (showing only reference numeral 81 on the near side) attached to the rear frame 73. The upper link mechanism 21 also includes two pieces of first power unit side links 87, 88 (showing only reference numeral 87 on the near side) of roughly triangular shape. A first end of the first power unit side link 87 is connected to the other end of the first frame side link 83, and a second end thereof is connected to an upper protruding portion 86 protruding from a crankcase 84 of the power unit 23.

Also shown are a first frame side pivot 91 connecting the upper brackets 81, 82, and the first frame side link 83. A first link pivot 92 connects the first frame side link 83 and the first power unit side link 87. A first power unit side pivot 93 connects the first power unit side link 87 and the upper protruding portion 86. A first middle shaft 94 connects a middle portion of the first frame side link 83 and a third end of the first power unit side link 87.

The lower link mechanism 22 includes two pieces of second frame side links 101, 102 (showing only reference numeral 101 on the near side) of triangle shape. An end of the second frame side link 101 is swingably attached to one of the rear frames 73, 73 (showing only reference numeral 73 on the near side). And the lower link mechanism 22 also includes a second power unit side link 106. One end of the second power unit side link 106 is swingably attached to the second ends of the second frame side links 101, 102; and the other end thereof is swingably connected to lower protruding portions 103, 104 (showing only reference numeral 103 on the near side) protruding from the crankcase 84 of the power unit 23.

A second frame side pivot 111 connects the rear frames 73, 73 and the second frame side links 101, 102. A second link pivot 112 connects the second frame side links 101, 102 and the second power unit side link 106. A second power unit side pivot 113 connects the second power unit side link 106 and the lower protruding portions 103, 104. A second middle shaft 114 connects third ends of the second frame side links 101, 102 and a middle portion of the second power unit side link 106. Crankshaft 116 is part of engine 51. Reference numeral 117 designates the center of gravity 117 of the power unit 23 including the rear wheel 24, the intake system 57, and the exhaust system 58 (to be more precise, a portion which swings as a unit with help of the upper link mechanism 21 and the lower link mechanism 22). A cylinder axis line 118 passes through the center of a cylinder (not shown) housing a piston (not shown) in a cylinder portion 55 such that the piston can freely move. Balancer shaft 119 includes a weight 119a.

Figure 3:
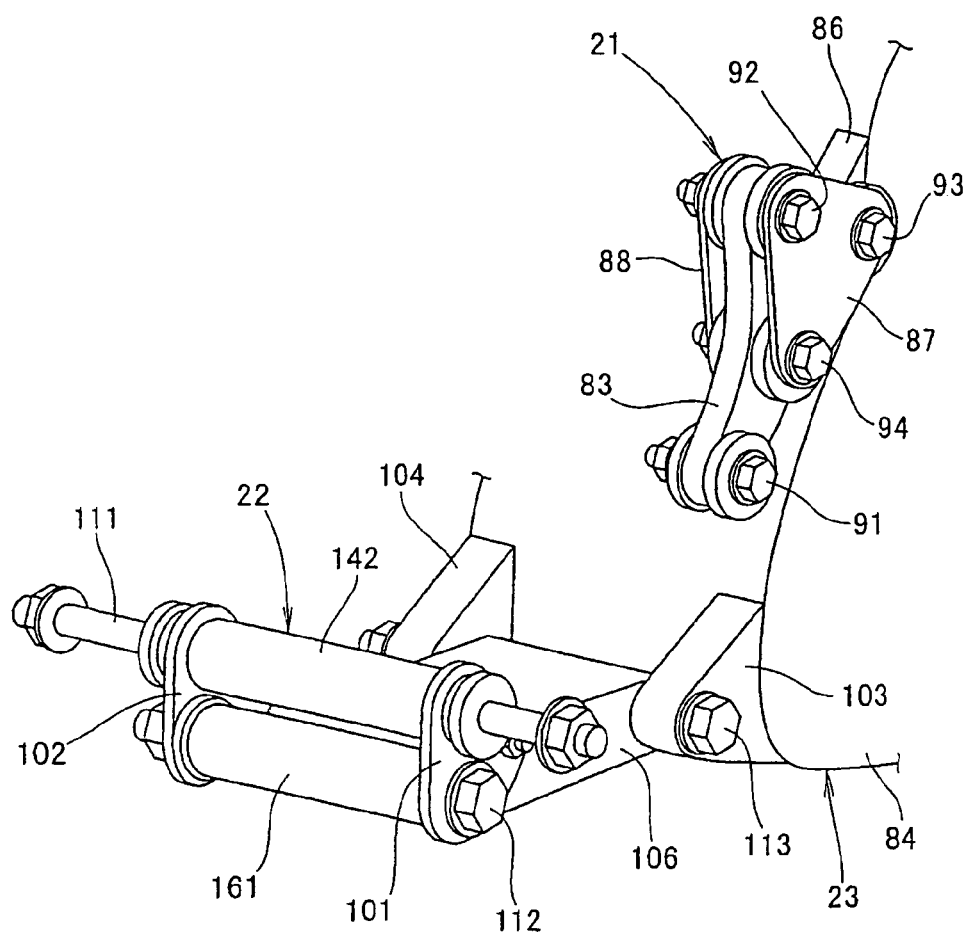
FIG. 3 is a perspective view showing an upper link mechanism and a lower link mechanism in the present invention.

FIG. 3 is a perspective view showing an upper link mechanism and a lower link mechanism in the present invention. Shown in the figure are the first frame side link 83 swingably attached to the first frame side pivot 91 of the upper link mechanism 21. Also shown are the first power unit side links 87, 88 swingably connected to the first frame side link 83 through the first link pivot 92. These first power unit side links 87, 88 are swingably connected to the upper protruding portion 86 of the power unit 23 through the first power unit side pivot 93, as shown in the figure.

FIG. 3 also shows that the second frame side links 101, 102 are swingably attached to the second frame side pivot 111 of the lower link mechanism 22. Also shown in the figure is the second power unit side link 106 swingably connected to these second frame side links 101, 102 through the second link pivot 112. And the second power unit side link 106 is connected to the lower protruding portions 103, 104 of the power unit 23 through the second power unit side pivot 113, as shown in the figure.

Figure 4:
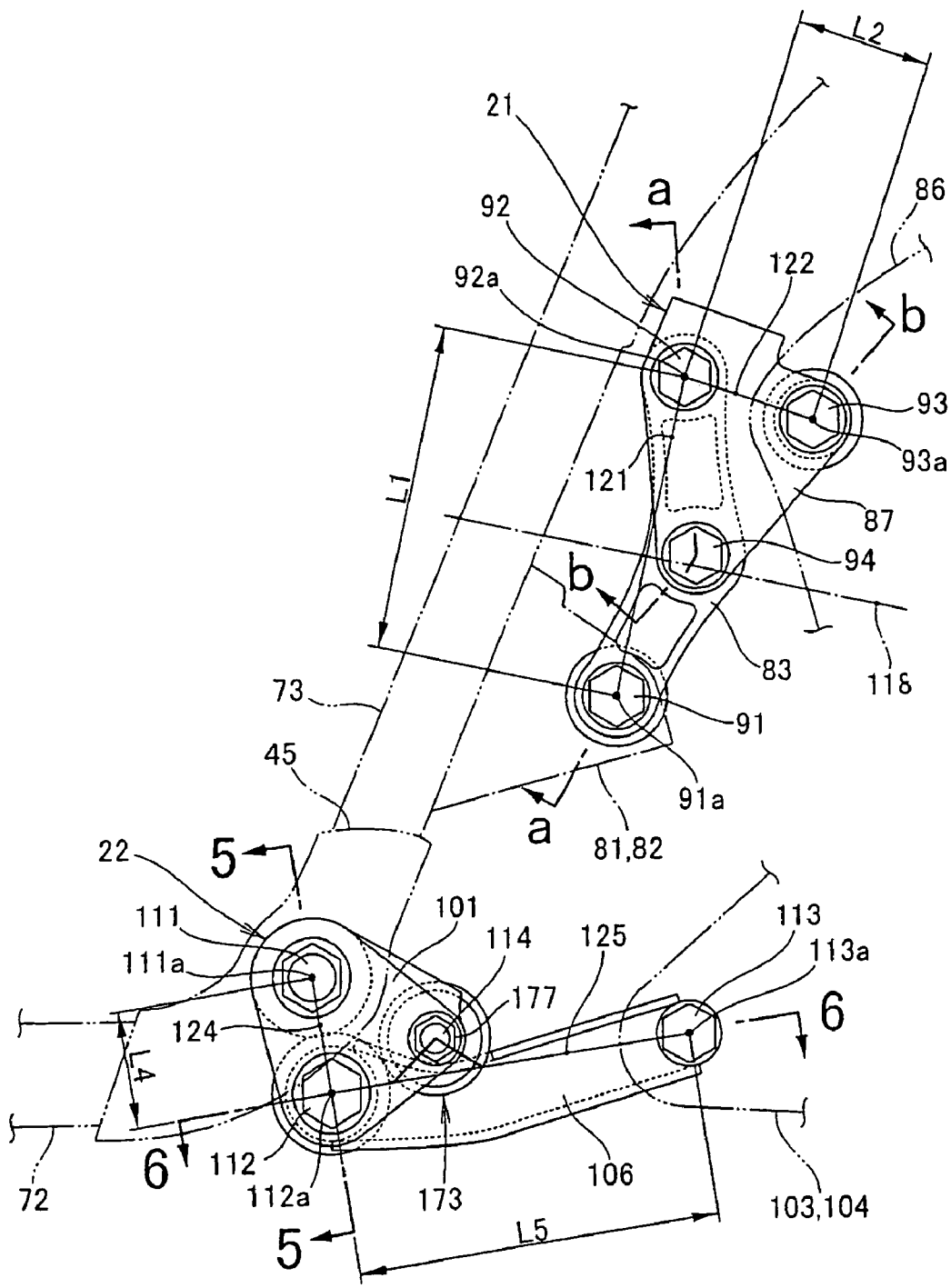
FIG. 4 is a side elevational view showing a main part of an upper link mechanism and a lower link mechanism in the present invention.

FIG. 4 is a side elevational view showing a main part of an upper link mechanism and the lower link mechanism in the present invention. A first line segment 121 has a length L1 and connects the first frame side pivot 91 (specifically, an axis line 91a (a portion shown by a black circle—a black circle shows an axis line, hereinafter)) and the first link pivot 92 (specifically, an axis line 92a) of the upper link mechanism 21. A second line segment 122 has a length L2 and connects the first link pivot 92 (specifically, the axis line 92a) and the first power unit side pivot 93 (specifically, an axis line 93a).

Incidentally, back in FIG. 2, defined as a line segment connecting the first power unit side pivot 93 (specifically, the axis line 93a) and the center of gravity 117 of the power unit 23, a third line segment 123 is nearly parallel to the cylinder axis line 118.

Furthermore, in FIG. 4, a fourth line segment 124 having length L4 connects the second frame side pivot 111 (specifically, an axis line 111a) and the second link pivot 112 (specifically, an axis line 112a) of the lower link mechanism 22. A fifth line segment 125 having length L5 connects the second link pivot 112 and the second power unit side pivot 113 (specifically, an axis line 113a).

The above-mentioned first line segment 121 is approximately perpendicular to the cylinder axis line 118. The second line segment 122 is approximately parallel to the third line segment 123 (refer to FIG. 2) and also approximately parallel to the cylinder axis line 118. The relationships between the lengths of the line segments are L1>L4, and L2<L5.

Figure 5:
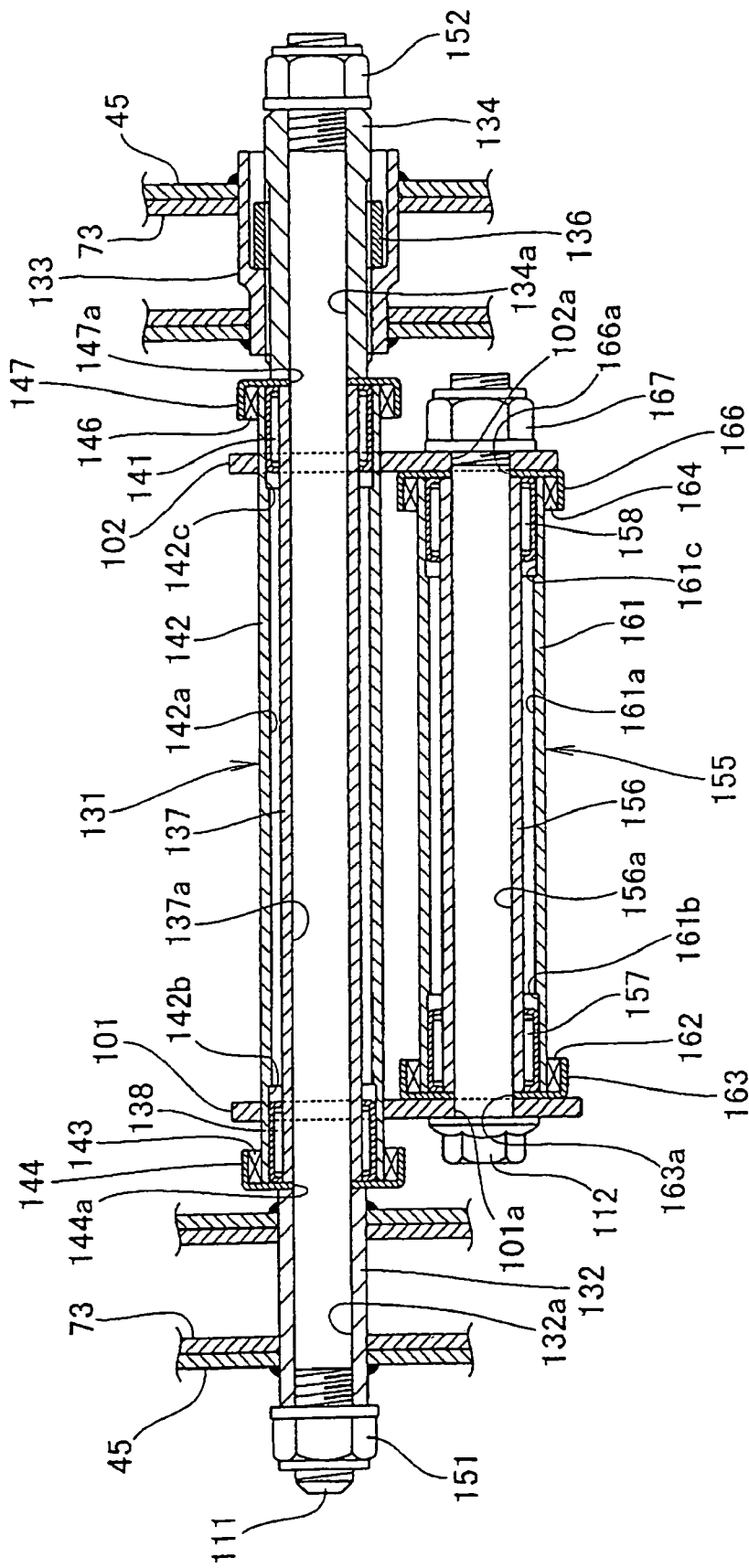
FIG. 5 is a sectional view taken along the line 5-5 in FIG. 4.

FIG. 5 is a sectional view taken along the line 5-5 in FIG. 4. A front upper connecting mechanism 131, connecting the second frame side pivot 111 and the second frame side links 101, 102 includes a left cylindrical portion 132, attached to the front upper connecting mechanism by causing the left cylindrical portion 132 to penetrate through the reinforcing member 45 and the rear frame 73 both on the left side, and provided with a hollow portion 132a into which the second frame side pivot 111 is inserted. A right outer cylindrical portion 133 is attached to the front upper connecting mechanism by causing the right outer cylindrical portion 133 to penetrate through the reinforcing member 45 and the rear frame both on the right side. A right inner cylindrical portion 134 is screwed into and connected to the right outer cylindrical portion 133, and is provided with a hollow portion 134a into which the second frame side pivot 111 is inserted.

A locknut 136 fixes the right inner cylindrical portion 134 to the right outer cylindrical portion 133. An inner cylinder 137 is provided with a hollow portion 137a into which the second frame side pivot 111 is inserted. Needle bearings 138, 141 fit onto the outer circumferential surface of the internal cylinder 137 at both ends thereof. An outer cylinder 142 is provided with inner circumferential surfaces 142b, 142c which are formed in the two ends of a hollow portion 142a for the purpose of fitting these needle bearings 138 and 141 thereinto, the inner diameter commonly of the inner circumferential surfaces 142b, 142c being larger than that of the rest of the hollow portion 142a. A cup-shaped end plate 144 is interposed between the inner cylinder 137 and the left cylindrical portion 132, to which a dust seal 143 preventing dust and the like from entering the needle bearing 138 is annexed. An insertion through-hole 144a for the second frame side pivot 111 is formed in the cup-shaped end plate 144. The cup-shaped end plate 144, is interposed between the inner cylinder 137 and the right inner cylindrical portion 134. A dust seal 146 prevents dust and the like from entering the needle bearing 141, and an insertion through-hole 147a for the second frame side pivot 111 is formed in the cup-shaped end plate 144. The second frame side links 101, 102 are welded to the outer circumferential surface of both end portions of the outer cylinder 142 in the front upper-connecting mechanism 131.

The outer cylinder 142 rotates relative to the inner cylinder 137 with the needle bearings 138, 141 in between, so that the second frame side links 101, 102 swing relative to the second frame pivot 111. Nuts 151, 152 screw onto both of the male-threaded ends of the bolt-shaped second frame side pivot 111.

A front lower connecting mechanism 155 connecting the second frame side links 101, 102 and the second link pivot 112 to each other includes an inner cylinder 156 provided with a hollow portion 156a into which the second link pivot 112 is inserted. Needle bearings 157, 158 fit onto the outer circumferential surface of the internal cylinder 156 at both ends thereof. An outer cylinder 161 is provided with inner circumferential surfaces 161b, 161c which are formed in the two ends of a hollow portion 161a for the purpose of fitting these needle bearings 157, 158 thereinto, the inner diameter commonly of the inner circumferential surfaces 161b, 161c being larger than the rest of the hollow portion 161a. A cup shaped end plate 163 is interposed between the inner cylinder 156 and the second frame side link 101, to which a dust seal 162 preventing dust and the like from entering the needle bearing 157 is annexed. An insertion through-hole 163a for the second link pivot 112 is formed in the cup shaped end plate 163. A cup-shaped end plate 166 is interposed between the inner cylinder 156 and the second frame side link 102, to which a dust seal 164 preventing dust and the like from entering the needle bearing 158 is annexed, and an insertion through-hole 166a for the second link pivot 112 is formed therein.

The outer cylinder 161 rotates relative to the inner cylinder 156 with the needle bearings 157, 158 in between, so that the second power unit side link 106 (refer to FIG. 4) swings relative to the second link pivot 112. A bolt insertion through-hole 101a is formed in the second frame side link 101 for the second link pivot 112 to be passed through. A bolt insertion through-hole 102a is formed in the second frame side link 102, for the second link pivot 112 to pass through. Nut 167 screws onto a male-threaded end of the bolt-shaped second link pivot 112.

Figure 6:
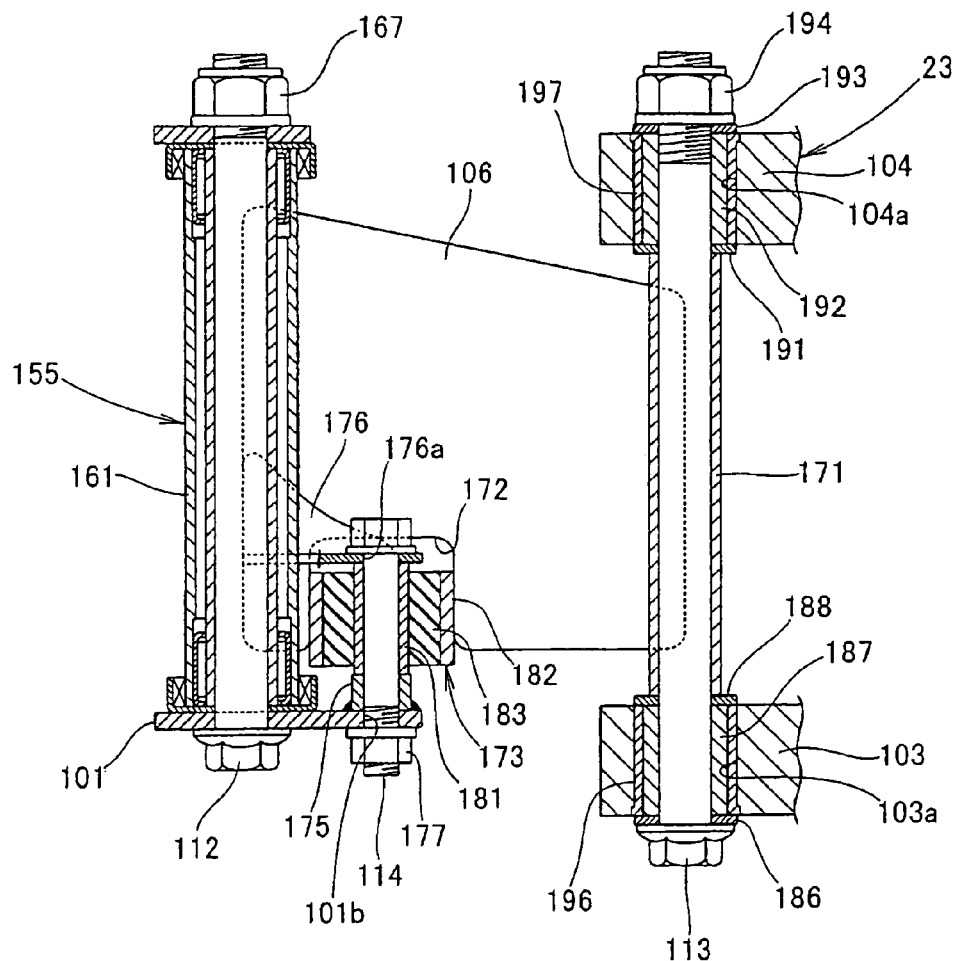
FIG. 6 is a sectional view taken along the line 6-6 in FIG. 4.

FIG. 6 is a sectional view taken along the line 6-6 in FIG. 4. The second power unit side link 106 is a member such that one end thereof is welded to the outer cylinder 161 of the front lower connecting mechanism 155, and the other end thereof is welded to a cylindrical member 171 fitted onto the second power unit side pivot 113. The second power unit side link 106 has a notch 172 formed on a side portion near the first link pivot 112, and to the notch 172, the second middle shaft 114 is attached through a rubber bushing 173.

The second middle shaft 114 is a bolt supported at an end thereof by the second frame side link 101 and a collar 175 attached inside of the second frame side link 101, and supported at the other end thereof by a supporting bracket 176 attached to the outer cylinder 161. And a rubber bushing 173 is fitted between the collar 175 and the supporting bracket 176. A bolt insertion through-hole 010b is formed in the second frame side link 101 through which the second middle shaft 114 is passed. A bolt insertion through-hole 1766a is formed in the supporting bracket 176 through which the second middle shaft 114 is passed. Nut 177 screws onto the second middle shaft 114 at an end thereof.

The rubber bushing 173 includes an inner cylinder 181 fitted onto the second middle shaft 114; an outer cylinder 182 disposed surrounding the inner cylinder 181, and attached to the second power unit side link 106; and a piece of rubber 183 adhered to the inner cylinder 181 and to the outer cylinder 182.

The second power unit side pivot 113 is a bolt which is passed through a washer 186, a bushing 187, a spacer 188, the cylindrical member 171, a spacer 191, a bushing 192, and a washer 193 in sequence, and onto an end of which a nut 194 is screwed. In the lower protruding portions 103, 104 of the power unit 23, through-holes 103a, 104a are formed. Collars 196, 197 are press-fitted into the insertion through-holes 103a, 104a. The above-mentioned bushing 187 is rotatably fitted into a collar 196, and the above-mentioned bushing 192 is rotatably fitted into the other collar 197. Thus, the power unit side link 106 is swingably connected to the lower protruding portions 103, 104.

Figure 7A:
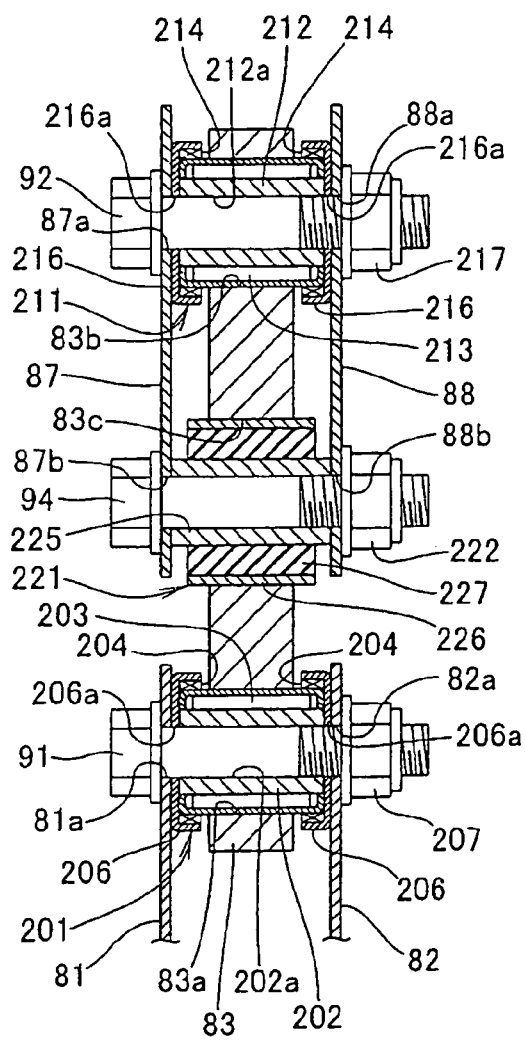
FIGS. 7(a) and 7(b) are sectional views of an upper link mechanism in the present invention.
Figure 7B:
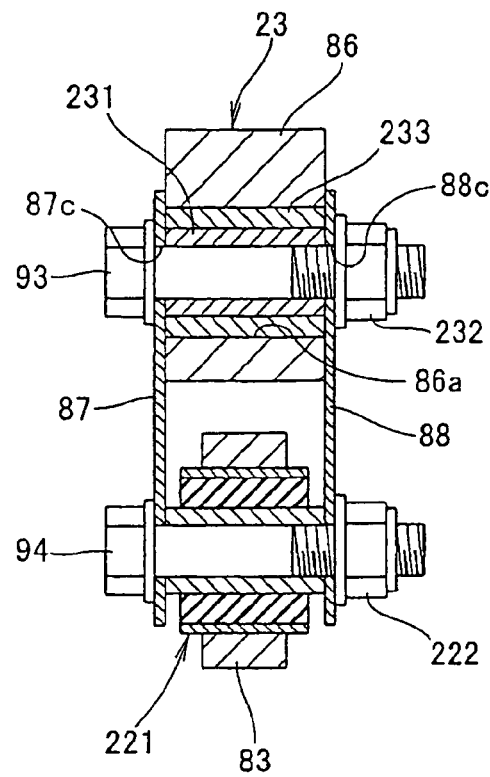

FIGS. 7(a) and 7(b) are sectional views of an upper link mechanism in the present invention.

FIG. 7(a) is a sectional view taken along the line a-a in FIG. 4. A lower connecting mechanism 201, connecting a first frame side pivot 91 and a first frame side link 83, includes an inner cylinder 202, provided with a hollow portion 202a, into which the first frame side pivot 91 is inserted. A needle bearing 203 fits onto the outer circumferential surface of the inner cylinder 202. Cup-shaped end plates 206, 206, are interposed between each end of the inner cylinder 203 and each one of the upper brackets 81, 82. A dust seal 204 preventing dust and the like from entering the needle bearing 203 is annexed to each of the cup-shaped end plates 206. Further, each of the cup-shaped end plates 206 is formed with an insertion through-hole 206a for the first frame side pivot 91.

The needle bearing 203 fits into an insertion through-hole 83a formed on the first frame side link 83 in the lower connecting mechanism 201. Bolt insertion through-holes 81a, 82a are formed in the upper brackets 81, 82 through which the first frame side pivot 91 passes. Nut 207 screws onto the bolt-shaped first frame side pivot 91 at an end thereof.

An upper connecting mechanism 211, connecting a first link pivot 92 and the first frame side link 83, includes an inner cylinder 212, provided with a hollow portion 212a into which the first link pivot 92 is inserted. Also included is a needle bearing 213, fitted onto the outer circumferential surface of the inner cylinder 212. End plates 216, 216 of cup shape are interposed between each end of the inner cylinder 212 and each of first power unit side links 87, 88. A dust seal 214 preventing dust and the like from entering the needle bearing 213 is annexed to each of the end plates 16, 216. In addition, in each of the end plates is formed with an insertion through-hole 216a for the first link pivot 92. The needle bearing 213 fits into an insertion through-hole 83b formed in the first frame side link 83 in the upper connecting mechanism 211. Bolt insertion through-holes 87a, 88a are formed in the first power unit side links 87, 88. Nut 217 screws onto the bolt-like first link pivot 92.

A first middle shaft 94 is a bolt, which passes through bolt insertion through-holes 87b, 88b formed in the first power unit side links 87, 88, and which is connected to the first frame side link 83 through a rubber bushing 221. A through-hole 83c is formed in the first frame side link 83 for the rubber bushing 221 to fit into. Nut 222 screws onto the first middle shaft 94 at an end thereof.

The rubber bushing 221 includes an inner cylinder 225, fitted onto the first middle shaft 94; an outer cylinder 226, provided outside of the inner cylinder 225, and fitted into the first frame side link 83; and a piece of rubber 227 adhered to the inner cylinder 225 and to the outer cylinder 226.

FIG. 7(b) is a sectional view taken along the line b-b in FIG. 4. A first power unit side pivot 93 is a bolt which passes through a bolt insertion through-hole 87c formed in the first power unit side link 87, a bushing 231, and a bolt insertion through-hole 88c formed in the first power unit side link 88 in sequence, and onto an end of which a nut 232 is screwed. In the upper protruding portion 86 of the power unit 23, an insertion through-hole 86a is formed. A collar 233 is pressfitted into this insertion through-hole 86a. And the above-mentioned bushing 231 is rotatably fitted into this collar 233. Thus, the first power unit side links 87, 88 are swingably connected to the upper protruding portion 86.

Next described are actions of the upper link mechanism 21 which is described above.

FIGS. 8(a) to 8(d) are drawings showing actions of an upper link mechanism in the present invention.

Figure 8A:
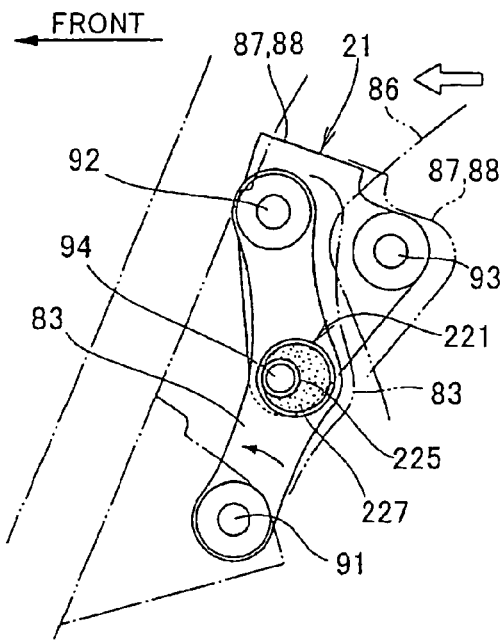
FIGS. 8(a) to 8(d) are drawings of actions showing actions of an upper link mechanism in the present invention.

In FIG. 8(a), when a power unit, specifically the upper protruding portion 86, is moved (displaced) forward of a vehicle as shown by an outline arrow, the first power unit side links 87, 88 of the upper link mechanism 21 are moved forward of a vehicle, and the first frame side link 83, connected to the first power unit side links 87, 88 through the first link pivot 92, swings counterclockwise about the first frame side pivot 91. (Incidentally, the positions of the first frame side link 83 and of the first power unit side links 87, 88 shown by an imaginary line are the ones in which they have been before moving or swinging (the position shown in FIG. 4); and imaginary lines in the following drawings are used for the same purpose.)

As a result, since the first middle shaft 94 moves forward of a vehicle along with the first power unit side links 87, 88, and the inner cylinder 225 of the rubber bushing 221 moves forward of a vehicle while causing deformation on the piece of rubber 227, an elastic force is produced in the rubber bushing 221. The elastic force causes the first power unit side links 87, 88 to swing counterclockwise about the first link pivot 92.

Figure 8B:
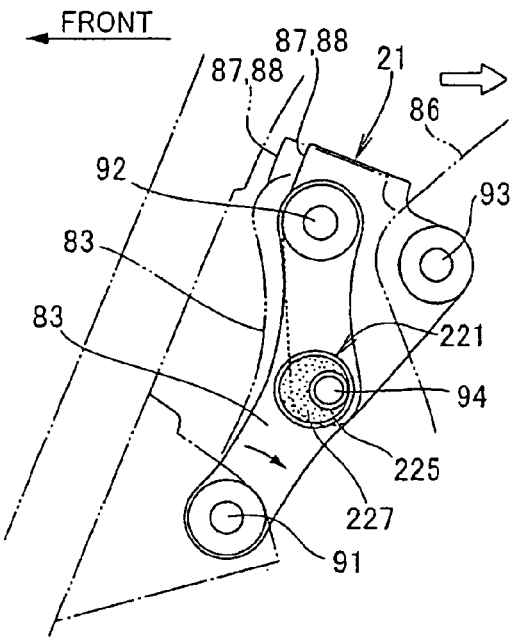

In FIG. 8(b), when the upper protruding portion 86 of the power unit moves backward of a vehicle as shown by an outline arrow, the first power unit side links 87, 88 of the upper link mechanism 21 move backward of a vehicle, and the first frame side link 83 swings clockwise about the first frame side pivot 91.

As a result, since the first middle shaft 94 moves backward of a vehicle along with the first power unit side links 87, 88, and the inner cylinder 225 of the rubber bushing 221 moves backward of a vehicle while causing deformation on the piece of rubber 227, an elastic force is produced in the rubber bushing 221. The elastic force causes the first power unit side links 87, 88 to swing clockwise about the first link pivot 92.

Figure 8C:
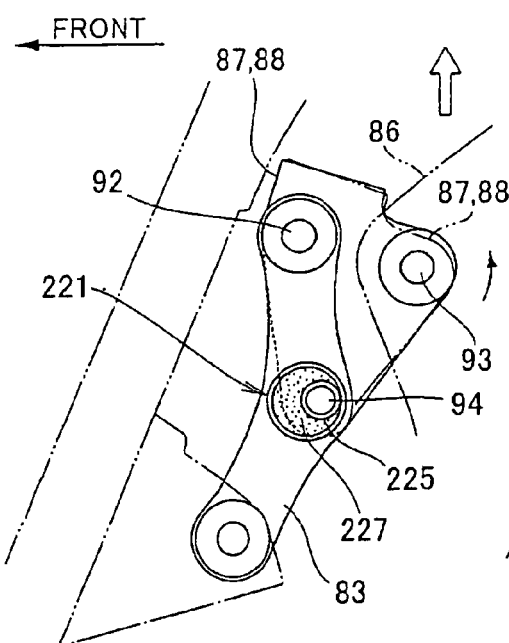

In FIG. 8(c), when the upper protruding portion 86 of the power unit moves upward as shown by an outline arrow, the first frame side link 83 extending in the up-and-down direction moves little. Thus the first power unit side links 87, 88 swing counterclockwise about the first link pivot 92.

As a result, since the first middle shaft 94 swings along with the first power unit side links 87, 88, and the inner cylinder 225 of the rubber bushing 221 also swings in a similar way to the first middle shaft 94, the piece of rubber 227 of the rubber bushing 221 deforms as shown in the drawing, and an elastic force causing the first power unit side links 87, 88 to swing clockwise about the first link pivot 92 is produced.

Figure 8D:
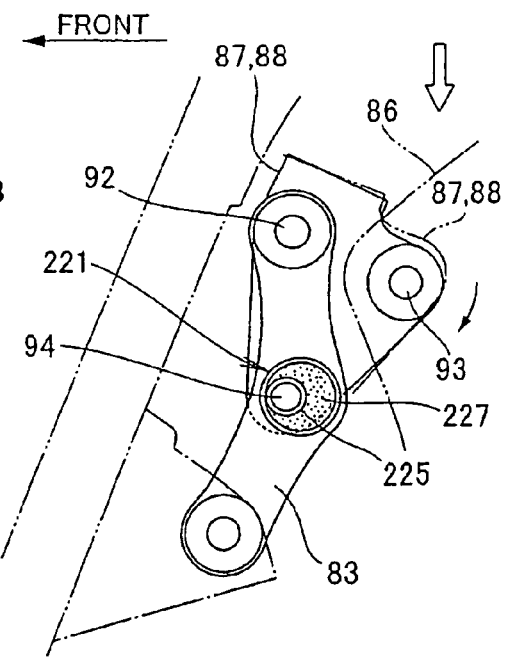

In FIG. 8(d), when the upper protruding portion 86 of the power unit 23 moves downward as shown by an outline arrow, the first frame side link 83 swings little. Therefore, the first power unit side links 87, 88 swing clockwise about the first link pivot 92.

As a result, since the first middle shaft 94 swings along with the first power unit side links 87, 88, and the inner cylinder 225 of the rubber bushing 221 also swings in a similar way to the first middle shaft 94, the piece of rubber 227 of the rubber bushing 221 deforms as shown in the drawing and an elastic force causing the first power unit side links 87, 88 to swing counterclockwise about the first link pivot 92 is produced.

In FIGS. 8(a) to 8(d) described above, with help of an elastic force and hysteresis produced in the rubber bushing 221 the power unit is capable of damping the vibrations thereof in the anteroposterior direction and in the up-and-down direction.

In FIGS. 8(a) to 8(d), actions of the upper link mechanism 21 are described by separating the moving directions of the power unit into the anteroposterior direction and the up-and-down directions. However, also in a case in which the power unit moves in both anteroposterior and up-and-down directions, in other words, not either in the anteroposterior direction or in the up-and-down direction, the upper link mechanism 21 is capable of following the movement of the power unit, so that the vibrations of the power unit in both directions can be absorbed.

Actions of the above-described lower link mechanism 22 are described next.

FIGS. 9(a) to 9(d) are the drawings of actions showing actions of a lower link mechanism in the present invention.

Figures 9A, 9B, 9C, 9D:
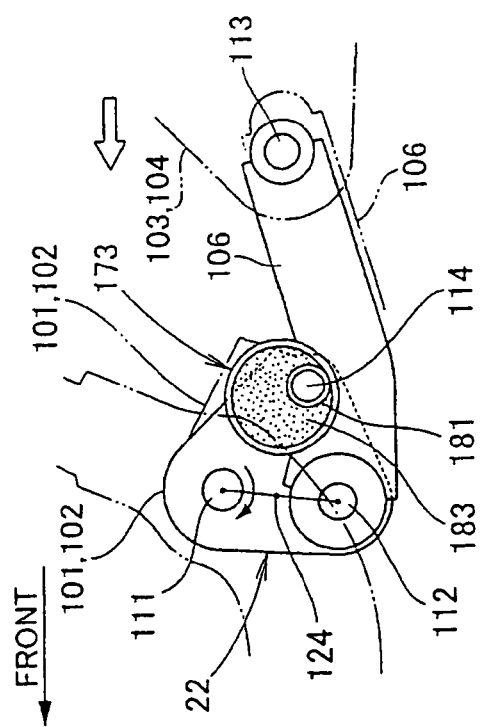
FIGS. 9(a) to 9(d) are drawings of actions showing actions of a lower link mechanism in the present invention.

In FIG. 9(a), when the lower protruding portions 103, 104 of the power unit move forward of a vehicle as shown by an outline arrow, the second power unit side link 106 of the lower link mechanism 22 moves forward of a vehicle, and the second frame side links 101, 102, connected to the second power unit side link 106 through the second link pivot 112, swing clockwise about the second frame side pivot 111. (Incidentally, the positions of the second frame side links 101, 102 and of the second power unit side link 106 shown by imaginary lines are the ones in which they have been before moving or swinging (the positions shown in FIG. 4); and imaginary lines in the following drawings are used for the same purpose.)

As a result, since the second middle shaft 114 swings along with the second frame side links 101, 102, and the inner cylinder 181 of the rubber bushing 173 causes the piece of rubber 183 to be deformed, an elastic force is produced in the rubber bushing 173. The elastic force causes the second frame side links 101, 102 to swing counterclockwise. In the state represented in the drawing, a fourth line segment 124 is roughly perpendicular to the cylinder axis line 118 (refer to FIG. 4).

In FIG. 9(b), when the lower protruding portions 103, 104 of the power unit move backward of a vehicle as shown by an outline arrow, the second power unit side link 106 moves backward of a vehicle and the second frame side links 101, 102 swing counterclockwise about the second frame side pivot 111.

As a result, since the second middle shaft 114 swings along with the second frame side links 101, 102, and the inner cylinder 181 of the rubber bushing 173 causes the piece of rubber 183 to be deformed, an elastic force is produced in the rubber bushing 173. The elastic force causes the second frame side links 101, 102 to swing clockwise.

In FIG. 9(c), when the lower protruding portions 103, 104 of the power unit move upward as shown by an outline arrow, the alignment of the second frame side pivot 111 and the second link pivot 112 almost in line with one above the other, allows the second frame side links 101, 102 to swing little. The second power unit side link 106, however, swings counterclockwise about the second link pivot 112.

As a result, since the outer cylinder 182 of the rubber bushing 173 swings along with the second power unit side link 106 and the outer cylinder 182 causes the piece of rubber 183 to be deformed, an elastic force is produced in the rubber bushing 173. The elastic force causes the second power unit side link 106 to swing clockwise.

In FIG. 9(d), when the lower protruding portions 103, 104 of the power unit move downward as shown by an outline arrow, the second frame side links 101, 102 swing little. The second power unit side link 106, however, swings clockwise about the second link pivot 112.

As a result, since the outer cylinder 182 of the rubber bushing 173 swings along with the second power unit side link 106, and the outer cylinder 182 causes the rubber 183 to be deformed, an elastic force is produced in the rubber bushing 173. The elastic force causes the second power unit side link 106 to swing counterclockwise.

In FIGS. 9(a) to 9(d) described above, with help of an elastic force and hysteresis produced in the rubber bushing 173 the power unit is capable of damping the vibrations thereof in the anteroposterior direction and in the up-and-down direction.

In FIGS. 9(a) to 9(d), actions of the lower link mechanism 22 are described by separating the moving directions of the power unit into the anteroposterior direction and the up-and-down direction. However, also in a case in which the power unit moves in both anteroposterior and up-and-down directions, in other words, not either in the anteroposterior direction or in the up-and-down direction, the lower link mechanism 22 is capable of following the movement of the power unit, so that the vibrations of the power unit in both directions can be absorbed.

Next, actions of the above-described upper link mechanism 21 and the above-described lower link mechanism 22 are described.

Figure 10:
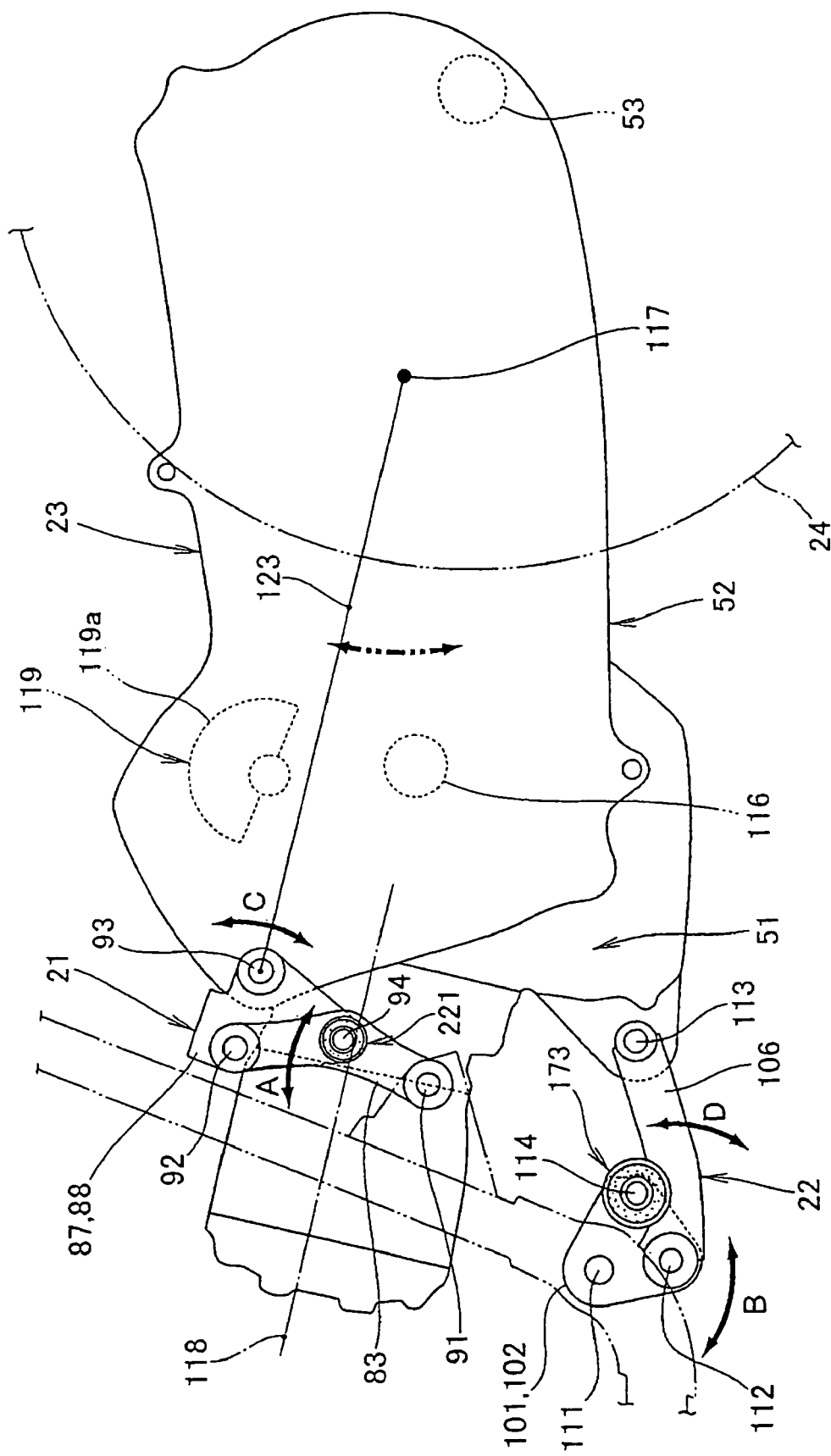
FIG. 10 is drawing of actions showing actions of an upper link mechanism and a lower link mechanism in the present invention.

FIG. 10 is the drawing of actions showing actions of an upper link mechanism and a lower link mechanism in the present invention.

In the power unit 23, almost all inertia forces generated in the engine 51 in a direction of the cylinder axis line 118 and in a direction perpendicular to the cylinder axis line 118 are counteracted by a counter weight (not shown) of the crankshaft 116 and a weight 119a of the balancer shaft 119. However, a secondary vibration in the direction of the cylinder axis line 118 and a rotational vibration (a vibration in the direction of an arrow shown by a two-dot chain line) about a center of gravity 117 are produced. The rotational vibration is caused by a coupling force, which occurs due to the distance between the crankshaft 116 and the balancer shaft 119. (The latter rotational vibration about the center of gravity 117 caused by a coupling force is, actually, a rotational vibration about a contact point 240 of the rear wheel 24 shown in FIG. 2.)

In FIG. 10, the secondary vibration in the direction of the cylinder axis line 118 of the power unit 23 is absorbed by a swing in the direction of an arrow A about the first frame side pivot 91 in the first frame side link 83 of the upper link mechanism 21, and by a swing in the direction of an arrow B about the second frame side pivot 111 in the second frame side links 101, 102 of the lower link mechanism 22.

Furthermore, the rotational vibration about the center of gravity 117, caused by a coupling force which occurs due to the distance between the crankshaft 116 and the balancer shaft 119 of the power unit 23, is absorbed by a swing in the direction of an arrow C about the first link pivot 92 in the first power unit side links 87, 88 of the upper link mechanism 21, and by a swing in the direction of an arrow D about the second link pivot 112 in the second power unit side link 106 of the lower link mechanism 22.

As shown in FIG. 4, since the relationship between the length L1 of the first line segment 121 of the upper link mechanism 21 and the length L4 of the fourth line segment 124 of the lower link mechanism 22 is such that L1>L4, the upper link mechanism 21 can cope with a larger displacement of the power unit 23 in the direction of the cylinder axis line 118 than the lower link mechanism 22 can. Thus, the upper link mechanism 21 can easily absorb the secondary vibration in the direction of the cylinder axis line 118.

Moreover, since the relationship between the length L2 of the second line segment 122 of the upper link mechanism 21 and the length L5 of the fifth line segment 125 of the lower link mechanism 22 is such that L2<L5, the lower link mechanism 22 can cope with a larger displacement of the power unit 23 in a direction approximately perpendicular to the cylinder axis line 118 than the upper link mechanism 21 can. Thus, the lower link mechanism 22 can easily absorb the rotational vibration about the center of gravity 117 caused by a coupling force, which occurs due to the distance between the crankshaft 116 and the balancer shaft 119 shown in FIG. 10.

As shown in FIGS. 2 and 4, firstly, a feature of the present invention is that, a power unit supporting structure of the scooter type vehicle 10 (refer to FIG. 1) includes a power unit 23 having the cylinder axis line 118 tilted forward and the balancer shaft 119 for reducing vibrations. The power unit 23 is swingably connected to the vehicle frame 11 through the link mechanisms 21, 22. The upper link mechanism 21 as a link mechanism includes the first frame side link 83 which is swingably connected to the vehicle frame 11, specifically, to the first frame side pivot 91 provided to the upper brackets 81, 82 (showing only reference numeral 81 on the near side) of the rear frame 73; and the first power unit side links 87, 88 (showing only reference numeral 87 on the near side) which are swingably connected to the power unit 23 side, specifically to the first power unit side pivot 93 provided to the upper protruding portion 86.

Another feature is that, in the power unit supporting structure, the first frame side link 83 and the first power unit side links 87, 88 are swingably connected with the first link pivot 92. The first line segment 121 connecting the first frame side pivot 91 and the first link pivot 92 is disposed such that the line segment 121 is approximately perpendicular to the cylinder axis line 118. In addition, the second line segment 122 connecting the first power unit side pivot 93 and the second link pivot 92 is approximately parallel to the third line segment 123 connecting the first power unit side pivot 93 and the center of gravity 117 of the power unit 23.

Accordingly, the rotational vibration about the center of gravity 117 of the power unit 23, caused by a coupling force which occurs due to the distance between the crankshaft 116 and the balancer shaft 119, can be effectively checked with help of the first frame side link 83. At the same time, the secondary vibration in the direction of the cylinder axis line 118 of the power unit 23 can also be effectively checked with help of the first power unit side links 87, 88.

Secondly, a feature of the present invention is that the lower link mechanism 22 is provided as a second link mechanism, with which the power unit 23 is swingably connected to the vehicle frame 11. The second link mechanism 22 includes the second frame side links 101, 102 (showing only reference numeral 101 on the near side), swingably connected to the vehicle frame 11, specifically to the second frame-side pivot 111 provided to the rear frame 73. The second link mechanism also includes the second power unit side link 106, connected to the power unit 23 side, specifically to the second power unit-side pivot 113 provided to the lower protruding portions 103, 104.

Another feature is that the second frame side links 101, 102 and the second power unit side link 106 are swingably connected with second link pivot 112. The first line segment 121 of the link mechanism 21 is formed such that the length L1 of the first line segment 121 is greater than the length L4 of the fourth line segment 124 connecting the second frame side pivot 111 and the second link pivot 112. Further, the second line segment of the link mechanism 21 is formed such that the length L2 of the second line segment 122 is smaller than the length L5 of the fifth line segment 125 of the second link mechanism 22, connecting the second power unit side pivot 113 and the second link pivot 112.

Accordingly, the secondary vibration of the power unit 23 in the direction of the cylinder axis line 118 can be effectively absorbed mainly by the link mechanism 21, and the rotational vibration about the center of gravity 117, caused by a coupling force which occurs due to the distance between the crankshaft 116 and the balancer shaft 119, can be effectively absorbed mainly by the second link mechanism 22. Thus, the absorbing of vibrations in various directions can be shared by the link mechanisms 21 and 22, and the link mechanisms 21, 22 can be made to be appropriate to respective vibration modes.

Thirdly, a feature of the present invention is that the fourth line segment 124 is disposed in a tilted position in advance, such that the fourth line segment 124 becomes perpendicular to the cylinder axis line 118 when the power unit 23 swings.

By this arrangement, when the power unit 23 swings being exposed to a coupling force from the engine 51 and to an external force from the rear wheel 24, and the first line segment 121 connecting the first frame side pivot 91 and the first link pivot 92 becomes not perpendicular to the cylinder axis line 118 any longer, the fourth line segment 124 of the second link mechanism 22 connecting the second frame side pivot 111 and the second link pivot 112 becomes perpendicular to the cylinder axis line 118. Thus, the secondary vibration can be effectively checked by the second link mechanism 22.

Fourthly, a feature of the present invention is that the vehicle frame 11, specifically the lower frame 33, includes the down frame 71 extending obliquely backward and downward from the head pipe 12, the bottom frame 72 extending backward from the down frame 71, and the rear frame 73 extending obliquely backward and upward from a rear end of the bottom frame 72. In addition, the rear frame 73 is provided with both of the link mechanism 21 and the second link mechanism 22.

Hence, inputs to the vehicle frame 11 from the link mechanism 21 and the second link mechanism 22 can be concentrated onto the rear frame 73. Even when the vehicle frame 11 is deformed, the positional relationship between the link mechanism 21 and the second link mechanism 22 can be maintained approximately constant. Thus, high effectiveness of vibration insulation can be constantly brought about.

Fifth, a feature of the present invention is that the link mechanism 21 is disposed on a side of the power unit 23.

Accordingly, since the link mechanism 21 is disposed on a side of the power unit 23, a dead space on a side of the power unit 23 can be put to good use, and the scooter type vehicle 10 can be downsized.

Incidentally, as shown in FIG. 2, the upper link mechanism 23 is disposed on the left side of the cylinder portion 55, but it is not necessarily disposed there. It may be disposed on the right side thereof.

The power unit supporting structure of the present invention is suitable for use in a scooter type vehicle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A power unit supporting structure of a scooter vehicle in which a power unit including a cylinder axis line tilted forward and provided with a balancer shaft for reducing a vibration, is swingably connected to a vehicle frame through a link mechanism, the link mechanism of the power unit supporting structure comprising:

a frame side link swingably connected to a frame side pivot which is provided to the vehicle frame;

a power unit side link swingably connected to a power unit side pivot which is provided to a power unit side, the frame side link and the power unit side link being swingably connected to each other by a link pivot, wherein a first line segment connecting the frame side pivot and the link pivot is disposed approximately perpendicular to the cylinder axis line, and a second line segment connecting the power unit side pivot and the link pivot is approximately parallel to a third line segment connecting the power unit side pivot and a center of gravity of the power unit.

2. The power unit supporting structure of a scooter vehicle according to claim 1, power unit supporting structure further comprising:

a second link mechanism swingably connected the power unit to the vehicle frame, the second link mechanism including:

a second frame side link swingably connected to a second frame side pivot which is provided to the vehicle frame;

a second power unit side link connected to a second power unit side pivot which is provided to the power unit side, the second frame side link and the second power unit side link being swingably connected to each other by a second link pivot;

wherein the first line segment of the link mechanism is formed such that a length of the first line segment is greater than that of a fourth line segment connecting the second frame side pivot and the second link pivot, and the second line segment of the link mechanism is formed such that a length of the second line segment is smaller than that of a fifth line segment of the second link mechanism, connecting the second power unit side pivot and the second link pivot.

3. The power unit supporting structure of a scooter vehicle according to claim 2, wherein an upper part of the fourth line segment is tilted forward in advance of when the power unit swings, the fourth line segment becoming perpendicular to the cylinder axis line when the power unit swings.

4. The power unit supporting structure of a scooter vehicle according to claim 1, wherein the vehicle frame includes a down frame extending obliquely backward and downward from a head pipe, a bottom frame extending backward from the down frame, and a rear frame extending obliquely backward and upward from a rear end of the bottom frame, and wherein both of the link mechanism and the second link mechanism are provided to the rear frame.

5. The power unit supporting structure of a scooter vehicle according to claim 2, wherein the vehicle frame includes a down frame extending obliquely backward and downward from a head pipe, a bottom frame extending backward from the down frame, and a rear frame extending obliquely backward and upward from a rear end of the bottom frame, and wherein both of the link mechanism and the second link mechanism are provided to the rear frame.

6. The power unit supporting structure of a scooter vehicle according to claim 3, wherein the vehicle frame includes a down frame extending obliquely backward and downward from a head pipe, a bottom frame extending backward from the down frame, and a rear frame extending obliquely backward and upward from a rear end of the bottom frame, and wherein both of the link mechanism and the second link mechanism are provided to the rear frame.

7. The power unit supporting structure of a scooter vehicle according to claim 1, wherein the link mechanism is disposed on a side of the power unit.

8. The power unit supporting structure of a scooter vehicle according to claim 2, wherein the link mechanism is disposed on a side of the power unit.

9. The power unit supporting structure of a scooter vehicle according to claim 3, wherein the link mechanism is disposed on a side of the power unit.

10. The power unit supporting structure of a scooter vehicle according to claim 4, wherein the link mechanism is disposed on a side of the power unit.

11. A power unit supporting structure of a scooter vehicle in which a power unit including a cylinder axis line tilted forward and provided with a balancer shaft for reducing a vibration, is swingably connected to a vehicle frame through a link mechanism, the link mechanism of the power unit supporting structure comprising:

a frame side link swingably connected to a frame side pivot which is provided to the vehicle frame;

a power unit side link swingably connected to a power unit side pivot which is provided to a power unit side, the frame side link and the power unit side link being swingably connected to each other by a link pivot, wherein a first line segment connecting the frame side pivot and the link pivot is disposed approximately perpendicular to the cylinder axis line, and a second line segment connecting the power unit side pivot and the link pivot is approximately parallel to a third line segment connecting the power unit side pivot and a center of gravity of the power unit, wherein the power unit side link is substantially triangular-shaped.

12. The power unit supporting structure of a scooter vehicle according to claim 11, power unit supporting structure further comprising:

a second link mechanism swingably connected the power unit to the vehicle frame, the second link mechanism including:

a second frame side link swingably connected to a second frame side pivot which is provided to the vehicle frame;

a second power unit side link connected to a second power unit side pivot which is provided to the power unit side, the second frame side link and the second power unit side link being swingably connected to each other by a second link pivot;

wherein the first line segment of the link mechanism is formed such that a length of the first line segment is greater than that of a fourth line segment connecting the second frame side pivot and the second link pivot, and the second line segment of the link mechanism is formed such that a length of the second line segment is smaller than that of a fifth line segment of the second link mechanism, connecting the second power unit side pivot and the second link pivot.

13. The power unit supporting structure of a scooter vehicle according to claim 12, wherein the fourth line segment is disposed in a tilted position in advance of when the power unit swings, the fourth line segment becoming perpendicular to the cylinder axis line when the power unit swings.

14. The power unit supporting structure of a scooter vehicle according to claim 11, wherein the vehicle frame includes a down frame extending obliquely backward and downward from a head pipe, a bottom frame extending backward from the down frame, and a rear frame extending obliquely backward and upward from a rear end of the bottom frame, and
wherein both of the link mechanism and the second link mechanism are provided to the rear frame.

15. The power unit supporting structure of a scooter vehicle according to claim 11, wherein the link mechanism is disposed on a side of the power unit.

16. The power unit supporting structure of a scooter vehicle according to claim 11, wherein the frame side link is doglegged-shaped.

17. A power unit supporting structure of a scooter vehicle in which a power unit including a cylinder axis line tilted forward and provided with a balancer shaft for reducing a vibration, is swingably connected to a vehicle frame through a link mechanism, the link mechanism of the power unit supporting structure comprising:
   a frame side link swingably connected to a frame side pivot which is provided to the vehicle frame;
   a power unit side link swingably connected to a power unit side pivot which is attached to an upper protruding portion formed on the power unit, the frame side link and the power unit side link being swingably connected to each other by a link pivot,
   wherein a first line segment connecting the frame side pivot and the link pivot is disposed approximately perpendicular to the cylinder axis line, and
   a second line segment connecting the power unit side pivot and the link pivot is approximately parallel to a third line segment connecting the power unit side pivot and a center of gravity of the power unit,
   wherein the link pivot is positioned forward of the power unit side pivot, and above the frame side pivot.

18. The power unit supporting structure of a scooter vehicle according to claim 17, power unit supporting structure further comprising:
   a second link mechanism swingably connected the power unit to the vehicle frame, the second link mechanism including:
   a second frame side link swingably connected to a second frame side pivot which is provided to the vehicle frame;
   a second power unit side link connected to a second power unit side pivot which is provided to the power unit side, the second frame side link and the second power unit side link being swingably connected to each other by a second link pivot;
   wherein the first line segment of the link mechanism is formed such that a length of the first line segment is greater than that of a fourth line segment connecting the second frame side pivot and the second link pivot, and
   the second line segment of the link mechanism is formed such that a length of the second line segment is smaller than that of a fifth line segment of the second link mechanism, connecting the second power unit side pivot and the second link pivot.

19. The power unit supporting structure of a scooter vehicle according to claim 18, wherein the fourth line segment is disposed in a tilted position in advance of when the power unit swings, the fourth line segment becoming perpendicular to the cylinder axis line when the power unit swings.

20. The power unit supporting structure of a scooter vehicle according to claim 17, wherein the vehicle frame includes a down frame extending obliquely backward and downward from a head pipe, a bottom frame extending backward from the down frame, and a rear frame extending obliquely backward and upward from a rear end of the bottom frame, and
wherein both of the link mechanism and the second link mechanism are attached to the rear frame.

* * * * *